US012711807B2

(12) United States Patent
Zurauskas et al.

(10) Patent No.: US 12,711,807 B2
(45) Date of Patent: Aug. 18, 2026

(54) POLARIZATION SENSITIVE EYE AUTHENTICATION SYSTEM

(71) Applicant: Meta Platforms Technologies, LLC, Menlo Park, CA (US)

(72) Inventors: Mantas Zurauskas, Redmond, WA (US); Mohamed Tarek Ahmed El-Haddad, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 263 days.

(21) Appl. No.: 18/367,990

(22) Filed: Sep. 13, 2023

(65) Prior Publication Data

US 2025/0087023 A1 Mar. 13, 2025

(51) Int. Cl.

| | |
|---|---|
| ***G06V 40/19*** | (2022.01) |
| ***G06T 7/80*** | (2017.01) |
| ***G06V 10/141*** | (2022.01) |
| ***G06V 40/18*** | (2022.01) |
| ***G06V 40/40*** | (2022.01) |
| ***G06V 40/60*** | (2022.01) |

(52) U.S. Cl.

CPC ................ *G06V 40/19* (2022.01); *G06T 7/80* (2017.01); *G06V 10/141* (2022.01); *G06V 40/193* (2022.01); *G06V 40/197* (2022.01); *G06V 40/45* (2022.01); *G06V 40/67* (2022.01); *G06T 2207/30201* (2013.01)

(58) Field of Classification Search

CPC .... G06V 40/19; G06V 10/141; G06V 40/193; G06V 40/197; G06V 40/45; G06V 40/67; G06V 10/145; G06T 7/80; G06T 2207/30201; G06F 21/32; A61B 5/1171

See application file for complete search history.

(56) References Cited

U.S. PATENT DOCUMENTS

| | | | | |
|---|---|---|---|---|
| 9,946,943 | B2 * | 4/2018 | Ivanisov | G06V 40/19 |
| 10,013,055 | B2 * | 7/2018 | Perek | G02B 27/0093 |
| 10,049,272 | B2 * | 8/2018 | Agrawal | G06F 21/32 |
| 10,113,910 | B2 * | 10/2018 | Brunk | G01J 3/2803 |
| 10,444,704 | B2 | 10/2019 | Stafford | |
| 10,678,897 | B2 | 6/2020 | Skogö et al. | |
| 10,713,347 | B2 * | 7/2020 | Talwerdi | G06F 21/34 |

(Continued)

FOREIGN PATENT DOCUMENTS

JP 7131761 B2 9/2022

OTHER PUBLICATIONS

Ali A., "Biometric Liveness Detection Using Gaze Information," University of Kent (United Kingdom), Mar. 1, 2015, 10 Pages, Retrieved from the Internet URL: https://kar.kent.ac.uk/50524/.

(Continued)

*Primary Examiner* — Philip P. Dang
(74) *Attorney, Agent, or Firm* — Greenberg Traurig, LLP

(57) ABSTRACT

A system for authentication of a user includes a light source to transmit polarized light, a polarization sensor, and processing logic. The system may cause the light source to illuminate an eye of the user with the polarized light, cause the polarization sensor to take an image of the eye to collect polarization characteristics particular to the eye when illuminated with the polarized light, and compare the polarization characteristics with previously collected polarization characteristics to authenticate the user.

20 Claims, 7 Drawing Sheets

(56) References Cited

U.S. PATENT DOCUMENTS 11,216,647 B2 * 1/2022 He ........................ G06V 10/145
11,233,963 B2 * 1/2022 Chen .................... H10F 39/8027
11,238,598 B1 2/2022 Hall et al.
11,270,110 B2 * 3/2022 Kadambi ............. G06V 10/764
11,290,658 B1 * 3/2022 Venkataraman ....... H04N 23/75
11,295,475 B2 * 4/2022 Kalra ......................... G06T 7/75
11,302,012 B2 * 4/2022 Kalra ......................... G06T 7/11
11,393,117 B2 * 7/2022 Mosher ..................... G06T 7/55
11,418,762 B2 * 8/2022 Levi ...................... B60W 30/00
11,525,906 B2 * 12/2022 Kadambi ........... G01B 11/0641
11,569,283 B2 * 1/2023 Yamashita .......... H10F 39/8053
11,588,976 B2 * 2/2023 Kitamura ............... H04N 23/75
11,689,813 B2 * 6/2023 Taamazyan .......... H04N 23/741 348/229.1
11,758,109 B2 * 9/2023 Chen ...................... H04N 23/55 348/49
11,781,913 B2 * 10/2023 McEldowney ....... H10F 39/806 356/364
11,797,863 B2 * 10/2023 Venkataraman ....... G06N 3/094
11,841,522 B2 * 12/2023 Siddique ............... G01J 3/2823
11,871,132 B2 * 1/2024 Padmanabhan ...... H04N 25/778
11,953,700 B2 * 4/2024 Venkataraman ..... G02B 27/288
11,954,886 B2 * 4/2024 Taamazyan .......... G06V 10/147
11,986,955 B2 * 5/2024 Agarwal ................ B25J 9/1697
12,020,455 B2 * 6/2024 Taamazyan ............ H04N 23/75
12,032,278 B2 * 7/2024 Barbour ............... H04N 13/257
12,035,057 B1 * 7/2024 Park ..................... G02B 21/367
12,067,746 B2 * 8/2024 Taamazyan ............... G06T 7/75
12,135,240 B2 * 11/2024 Jacob .................. G06F 18/2431
12,142,025 B2 * 11/2024 Taamazyan .......... G06V 10/751
12,169,144 B2 * 12/2024 Liang .................... G01J 3/2803
12,172,310 B2 * 12/2024 Stoppi ....................... G06T 7/50
12,175,600 B2 * 12/2024 Barbour .................. G06T 7/174
12,175,741 B2 * 12/2024 Taamazyan ............... G06T 7/70
12,249,101 B2 * 3/2025 Kadambi .................. G06T 5/20
12,277,794 B1 * 4/2025 Wang ................... G06V 10/143
12,340,538 B2 * 6/2025 Venkataraman ......... G06N 3/08
12,342,648 B2 * 6/2025 Barbour ................ H10F 39/806
12,450,764 B2 * 10/2025 Barbour ................ G06F 18/214
2016/0342782 A1 11/2016 Mullins et al.
2017/0161578 A1 * 6/2017 Ivanisov ................ G06V 40/40
2017/0316266 A1 11/2017 Kawabata et al.
2019/0019025 A1 * 1/2019 Yamazaki .............. G06V 40/19
2019/0266398 A1 8/2019 Kanamori
2022/0300593 A1 * 9/2022 Brownlee .......... G06V 40/1353
2023/0288622 A1 * 9/2023 Sugano ................ G02B 5/3025
2023/0342444 A1 * 10/2023 Hammersberg ...... H10F 39/184

OTHER PUBLICATIONS

European Search Report for European Patent Application No. 24192215.2, dated Dec. 23, 2024, 6 pages.
Office Action mailed Nov. 3, 2025 for European Patent Application No. 24192215.2, filed on Jul. 31, 2024, 8 pages.

* cited by examiner 403A
409
407
413
411
403
402
401

POLARIZATION SENSITIVE EYE AUTHENTICATION SYSTEM

TECHNICAL FIELD

This disclosure relates generally to Artificial Reality (AR) and Virtual Reality (VR), and in particular to user authentication of AR/VR head mounted devices.

BACKGROUND INFORMATION

Eye recognition is a biometric identification technology that can be used for secure user authentication to allow access to devices, applications, and services. For example, the iris is the colored part of the eye that has a pattern unique to each person and is often used for eye-based user authentication. The iris includes muscles to control the amount of light that enters the eye through the pupil. Another part of the eye that may be used for identification is the retina. The retina lies at the back of the eye and includes complex patterns of blood vessels and cells sensitive to light.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
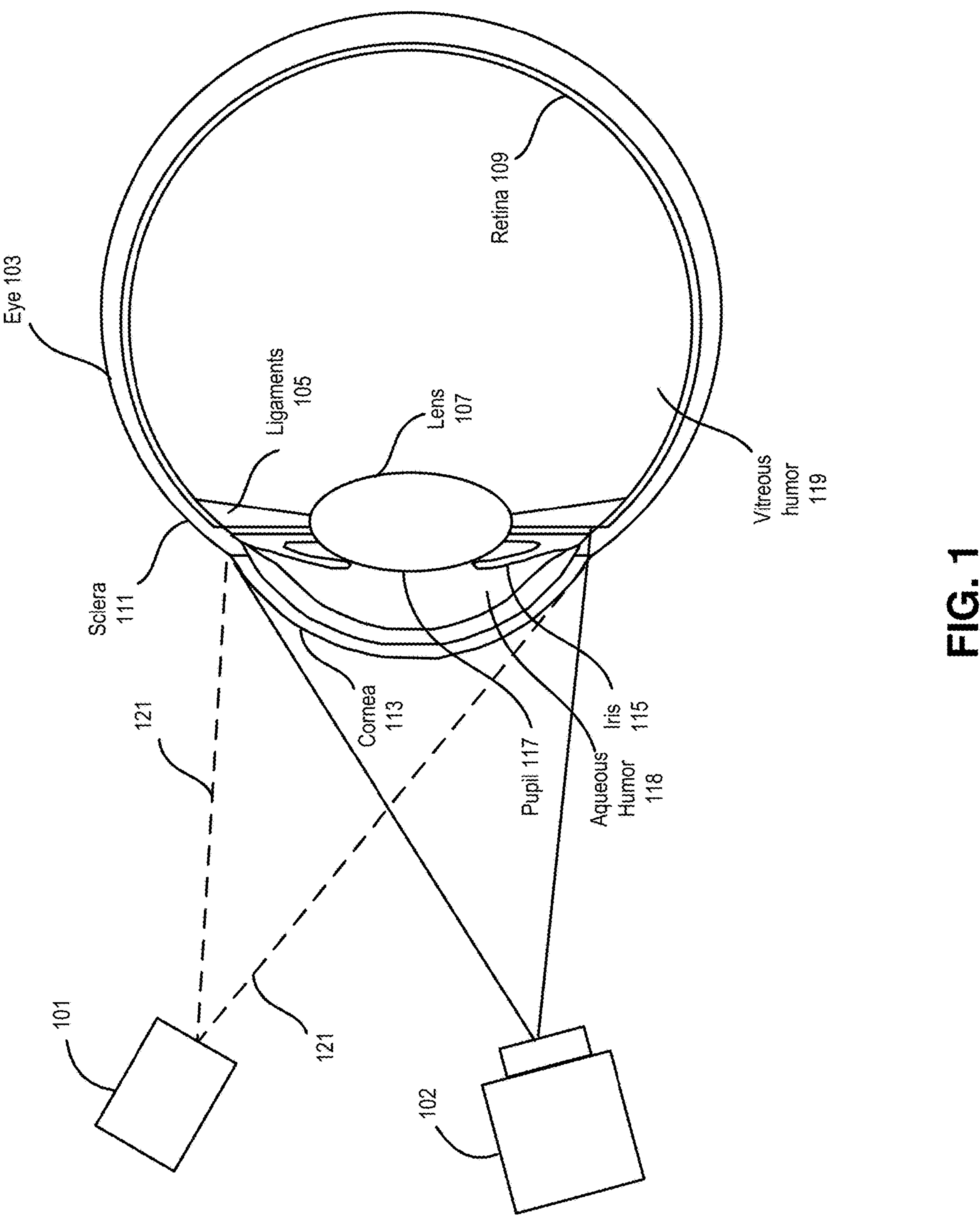
FIG. 1 illustrates a light source and a polarization sensor to collect polarization characteristics, in accordance with aspects of the disclosure.

Embodiments of a system for authentication of a user are described herein. In aspects, the system includes a light source to transmit polarized light and a polarization sensor. In embodiments, the light source illuminates an eye of the user and the polarization sensor then takes an image of the eye of the user. In aspects, polarization characteristics particular to the eye when illuminated with the polarized light are compared with previously collected polarization characteristics associated with the eye to authenticate the user.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In some implementations of the disclosure, the term "near-eye" may be defined as including an element that is configured to be placed within 50 mm of an eye of a user while a near-eye device is being utilized. Therefore, a "near-eye optical element" or a "near-eye system" would include one or more elements configured to be placed within 50 mm of the eye of the user.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.6 μm.

In aspects of this disclosure, the term "transparent" may be defined as having greater than 90% transmission of light. In some aspects, the term "transparent" may be defined as a material having greater than 90% transmission of visible light.

Secure user authentication is important for ensuring seamless access to devices, applications, and services. As noted above, iris-based authentication may be utilized for user identification. However, iris-focused sensors can fail for a number of reasons. For example, well-crafted still images or video sequences of an eye can fool the sensor. The reliability of any biometric identification depends on ensuring that the signal has been recorded from the actual user and is not a manufactured image.

In aspects, birefringence refers to a material having a refractive index that depends on the polarization and propagation direction of light. Tissues of the eye (e.g., the cornea or proximate tissues) may be uniquely birefringent, thus polarization sensing provides additional contrast that allows identification of a user as well as differentiation of a live eye from a phantom eye.

Accordingly, systems and methods for polarization sensitive eye authentication are described herein. In aspects, a light source may illuminate an eye of a user with polarized light. A polarization sensor may then capture intensity and polarization characteristics of the eye so that the polarization characteristics may be compared with previously collected information to authenticate the user. These and other embodiments are described in more detail in connection with FIGS. 1-7.

FIG. 1 illustrates a light source and a polarization sensor to collect polarization characteristics, in accordance with aspects of the disclosure. As shown, a light source 101 illuminates an eye 103 with polarized light 121. In aspects, a polarization sensitive sensor ("polarization sensor") 102 takes an image of eye 103. In aspects, polarization sensor 102 includes or is included in a polarization sensitive camera or a point scanner. Light source 101 may transmit light having different polarized states. As seen in FIG. 1, a simplified side-view of eye 103 includes ligaments 105, lens 107, pupil 117, iris 115, aqueous humor 118, vitreous humor 119, retina 109, and sclera 111. Muscles in iris 115 control the size of pupil 117 which is an opening in the center of the iris that allows light to enter eye 103.

In aspects, light source 101 transmits polarized light 121 with a particular polarization state. Polarization sensor 102 then may take an image of eye 103 to collect polarization characteristics particular to eye 103 when illuminated with polarized light 121. In examples, key contributors that may affect the polarization of the light that is returned from the iris include a type of tissue (e.g., may be approximately the same across the iris in normal eyes), topology of the iris, and corneal birefringence. In aspects, polarization sensor 102 is further configured to collect intensity information to authenticate a liveness of eye 103 of the user.

In embodiments, processing logic (not shown) may compare the polarization characteristics or information with previously collected polarization characteristics associated with eye 103 to authenticate the user. Previously collected polarization characteristics may be gathered during a calibration process where the eye 103 is illuminated with a particular polarization state and then the image or polarization characteristics stored for later authentication. In some embodiments, a multi-step calibration and multi-step authentication process may be used. For example, the user may be asked to look in different directions and a calibration step that captures relative changes in polarization characteristics may be used as information for user authentication.

Figure 2:
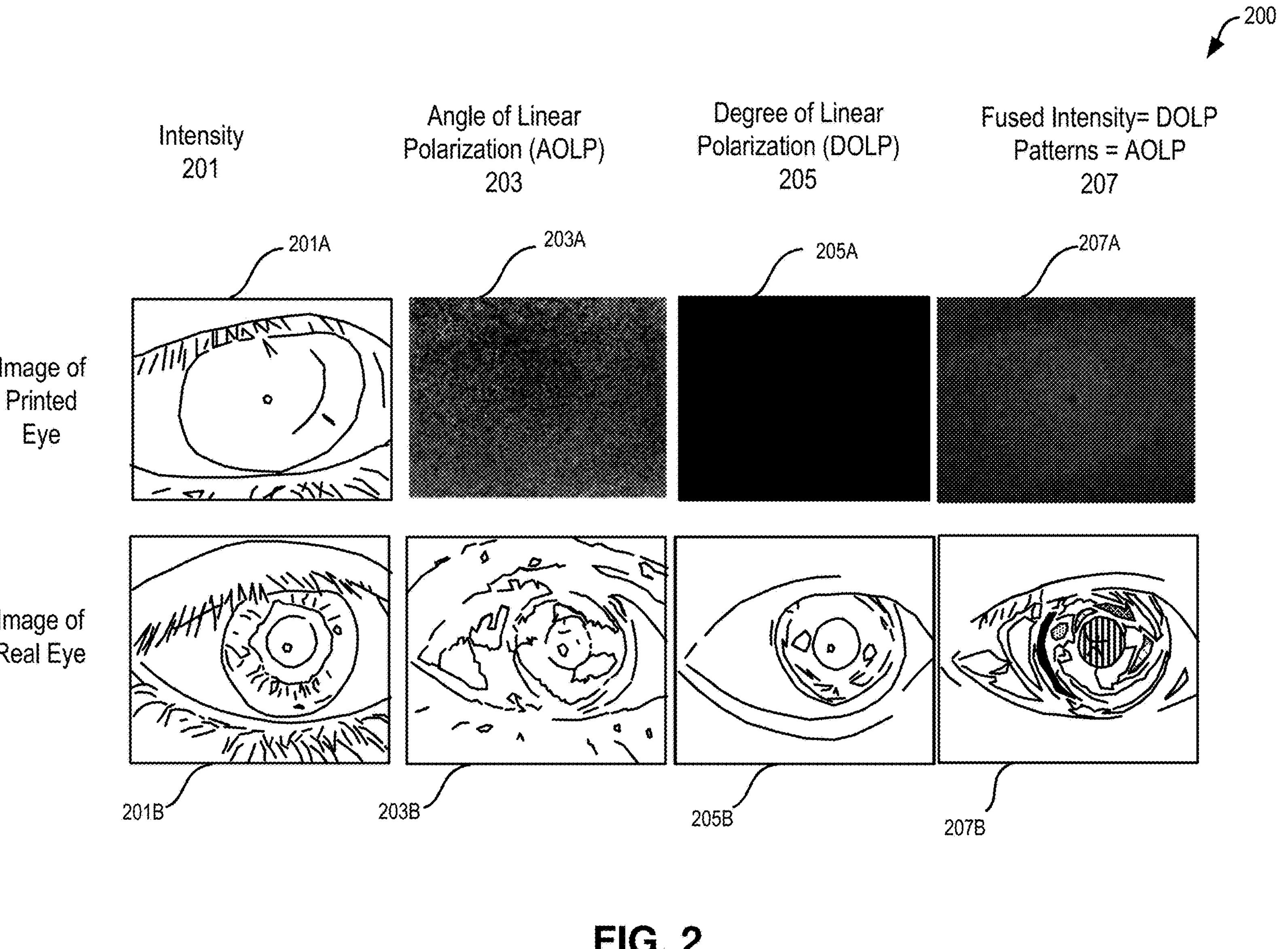
FIG. 2 represents a plurality of images of a real eye and a printed eye taken by a polarization sensitive camera, in accordance with aspects of the disclosure.

FIG. 2 represents a plurality of images 200 taken by a polarization sensitive camera of a printed eye and a real eye, in accordance with aspects of the disclosure. In the example, an eye may be illuminated with circular polarization from a light emitting diode transmitting a particular wavelength of light and an image is recorded with a polarization sensitive camera. It is appreciated that plurality of images 200 are merely examples and in various embodiments, the eye may vary in appearance and be illuminated with various polarization states (e.g., linear, elliptical or the like of various wavelengths) suitable for detecting unique polarization characteristics of a user's eye. Plurality of images 200 helps to illustrate how user identification and liveness detection can be determined via polarization sensing. For example, the top row includes examples/drawings of images taken of a printed eye versus the bottom row of examples/drawings of images taken of a real eye. Moving from left to right, the columns in plurality of images 200 represent images taken according to measurement of intensity 201 (printed eye 201A versus real eye 201B), angle of linear polarization (AOLP) 203 (printed eye 203A versus real eye 203B), degree of linear polarization (DOLP) 205 (printed eye 205A versus real eye 205B), and a fused image where AOLP, DOLP, and intensity components are represented as separate channels in a multi-channel image (printed eye 207A versus real eye 207B). For fused intensity example of real eye 207B, note that different patterns within image 207B may represent varying angles of linear polarization, while brightness may represent intensity or DOLP.

As noted previously, tissues of the eye (e.g., the cornea or proximate tissues) may be uniquely birefringent, thus polarization sensing provides additional contrast that allows identification of a user as well as differentiation of a live eye from a phantom eye. As shown, images of real eye 201B, 203B, 205B, and 207B of the bottom row illustrate distinct features that may not be able to be mimicked by images of a printed eye. In some aspects, a combination of intensity of a pattern of light received from an iris together with AOLP and/or DOLP may be used for both identifying a user and confirming liveness.

In some aspects, note that a single image may be used to identify a user. In other aspects, a time sequence captured with a polarization sensor (e.g., polarization sensor 102 of FIG. 1) may be used. Furthermore, a time sequence that captures, for example, iris constriction in response to increased light levels provided by a display (e.g., AR/VR display, discussed in connection with FIG. 5 and FIG. 6) may further increase robustness of liveness detection. In addition, liveness detection may be enhanced by measurements of pupil constriction/refraction in response to eye accommodation changes, while a gaze target is presented at different distances away from a user. In some embodiments, gaze targets are virtual targets presented in a display (e.g., an AR/VR display).

Note that in various aspects, a light source may transmit light having particular spectral characteristics, e.g., intensity in different wavelengths or polarized light at different wavelengths or both to further increase robustness of a polarization sensor. In additional aspects, for a polarization sensor that has depth resolution (such as low-coherence interferometry or optical coherence tomography), depth resolved polarization maps may increase robustness of liveness detection.

Figure 3:
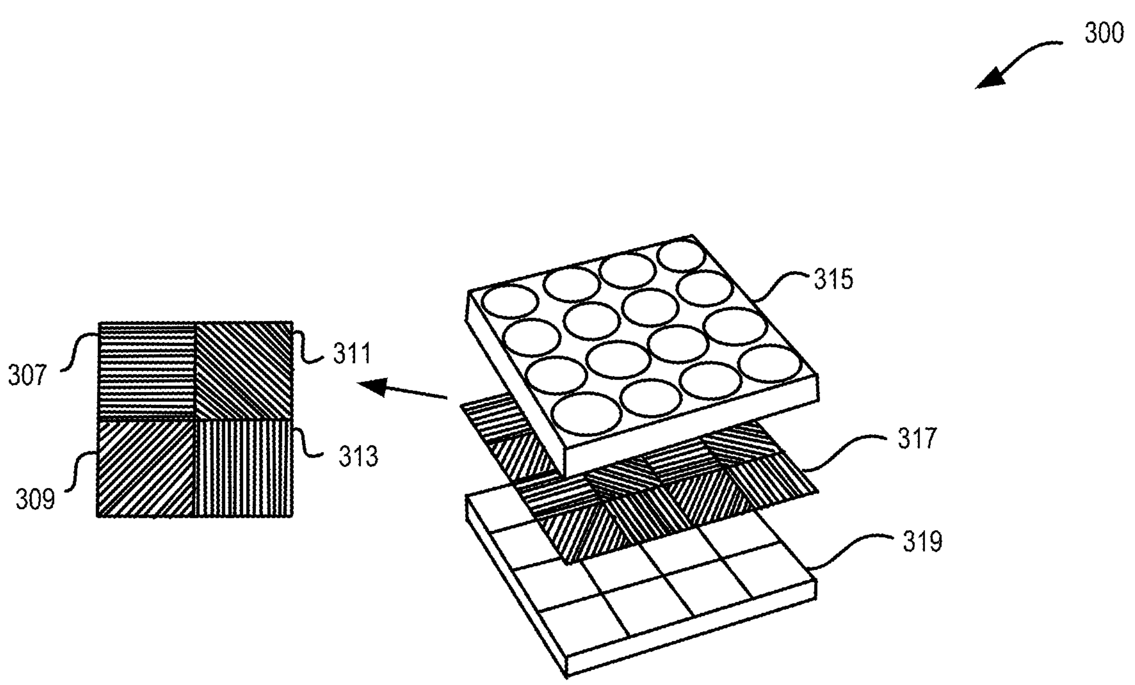
FIG. 3 illustrates an example of a polarization sensor, in accordance with aspects of the disclosure.

FIG. 3 illustrates an example of a polarization sensor, according to embodiments. Polarization sensor 300 may include or be included in a polarization sensitive camera. Polarization sensor 300 may include a microlens array 315, a polarizer array 317, and photodiodes 319. Polarizer array 317 may include a linear micro polarizer array to detect linear polarization states. Integrating polarizer array 317 between microlens array 315 and photodiodes 319 may minimize crosstalk and increase alignment accuracy between polarizer orientations and their respective pixels compared to a polarizer array that is placed in front of a microlens array.

As shown, polarizer array 317 includes wire grid polarizers fabricated substantially directly on photodiodes 319 and arranged in a mosaic pattern. In the example, each pixel is covered with one of four linear polarizers with orientations of −45° (e.g., 311), 0° (e.g., 307), 45° (e.g., 309), or 90° (e.g., 313). In aspects, pixel values may then be used to compute three polarization parameters for light incident at every pixel, e.g., intensity, degree of linear polarization, and azimuth.

Figure 4:
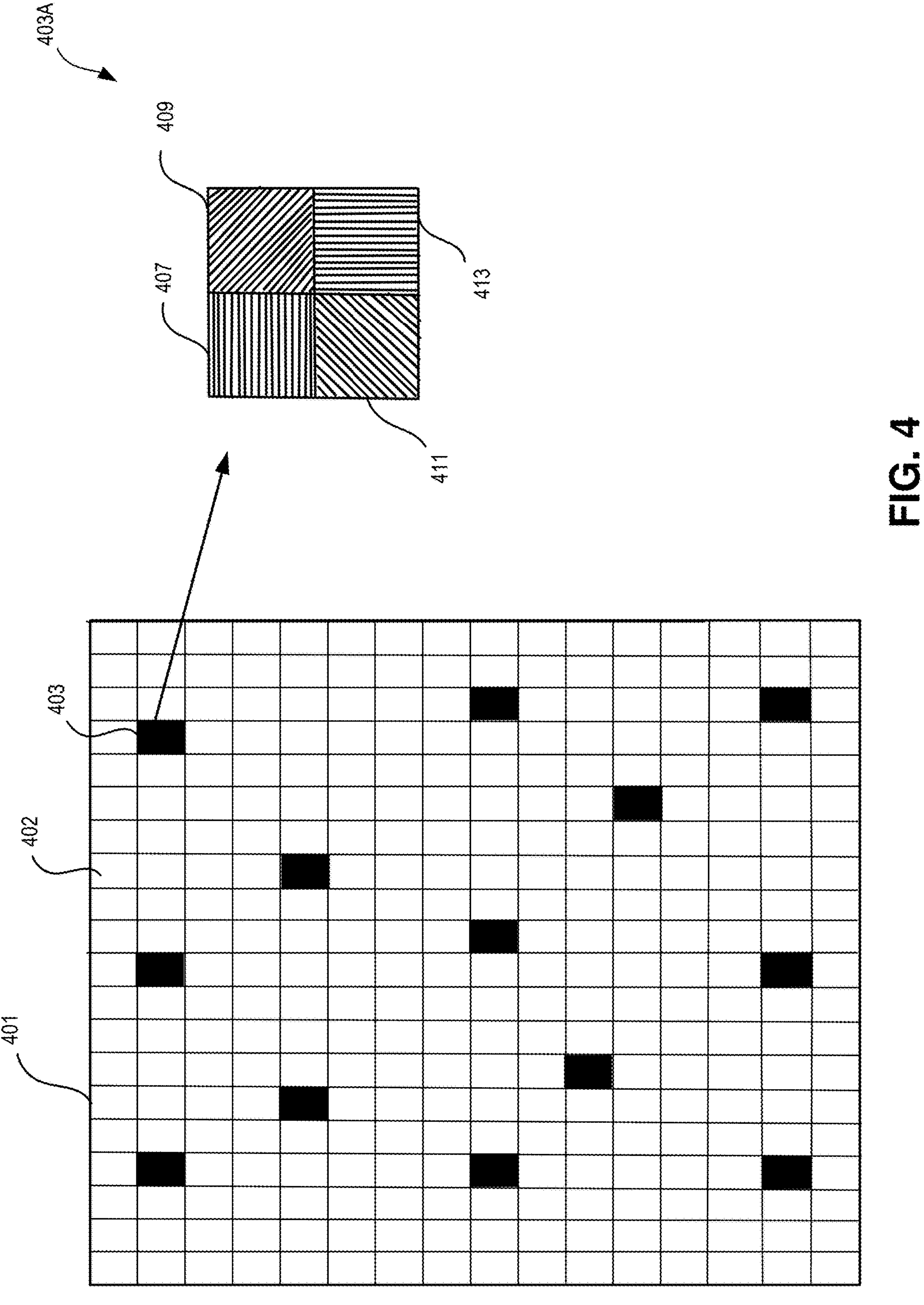
FIG. 4 illustrates an array of pixels that may be included a polarization sensor, in accordance with aspects of the disclosure.

FIG. 4 illustrates an array of pixels that may be included in a polarization sensor in accordance with aspects of the disclosure. In aspects, array of pixels 401 includes a combination of intensity-only sensitive pixels 402 and polarization sensitive pixels 403 to confirm a user's identity as well as liveness. In aspects, polarization sensitive pixels 403 are sparse in number (and in distribution) and are sensitive to different polarization states. In embodiments, array of pixels 401 has a density of intensity-only sensitive pixels 402 that is higher than a density of polarization sensitive pixels 403.

In embodiments, polarization sensitive pixels 403 may include one or more super pixels. A single super pixel (e.g., 403A) may include multiple polarization sensitive pixels to permit sampling different polarization states of light. For example, polarization sensitive pixel 403A may be covered with one of four linear polarizers with orientations of 45° (e.g., 411), 0° (e.g., 407), −45° (e.g., 409), or 90° (e.g., 413). Note that the arrangement of the four linear polarizers shown in FIG. 4 is merely an example and different permutations suitable to capture different polarization states are contemplated. In aspects, one or more filters deposited on top of one or more polarization sensitive pixels 403 may be either wire grid polarizers or metasurface-based polarization filters. In various embodiments, color filters may be included as part of, or proximate to, polarization super pixel 403A. Accordingly, in aspects and also as shown in FIG. 2, an AOLP and DOLP may be detected by array of pixels 401 and used for identifying the user.

In aspects, intensity-only sensitive pixels 402 that are dense in number and/or distribution may be useful for capturing high fidelity images of an iris for pattern recognition. Polarization sensitive pixels 403 that may be lower than intensity-only sensitive pixels 402 in density in number and/or distribution may be used for liveness detection by confirming corneal birefringence.

As shown, 13 out of 320 pixels include polarization sensitive pixels 403, while the remainder are intensity-only sensitive pixels 402. Note that array of pixels 401 is merely an example and that other ratios that successfully detect polarization states and intensity, e.g., DOLP, are contemplated. In other embodiments, all or substantially all of the pixels of array of pixels 401 may be polarization sensitive pixels.

Figure 5:
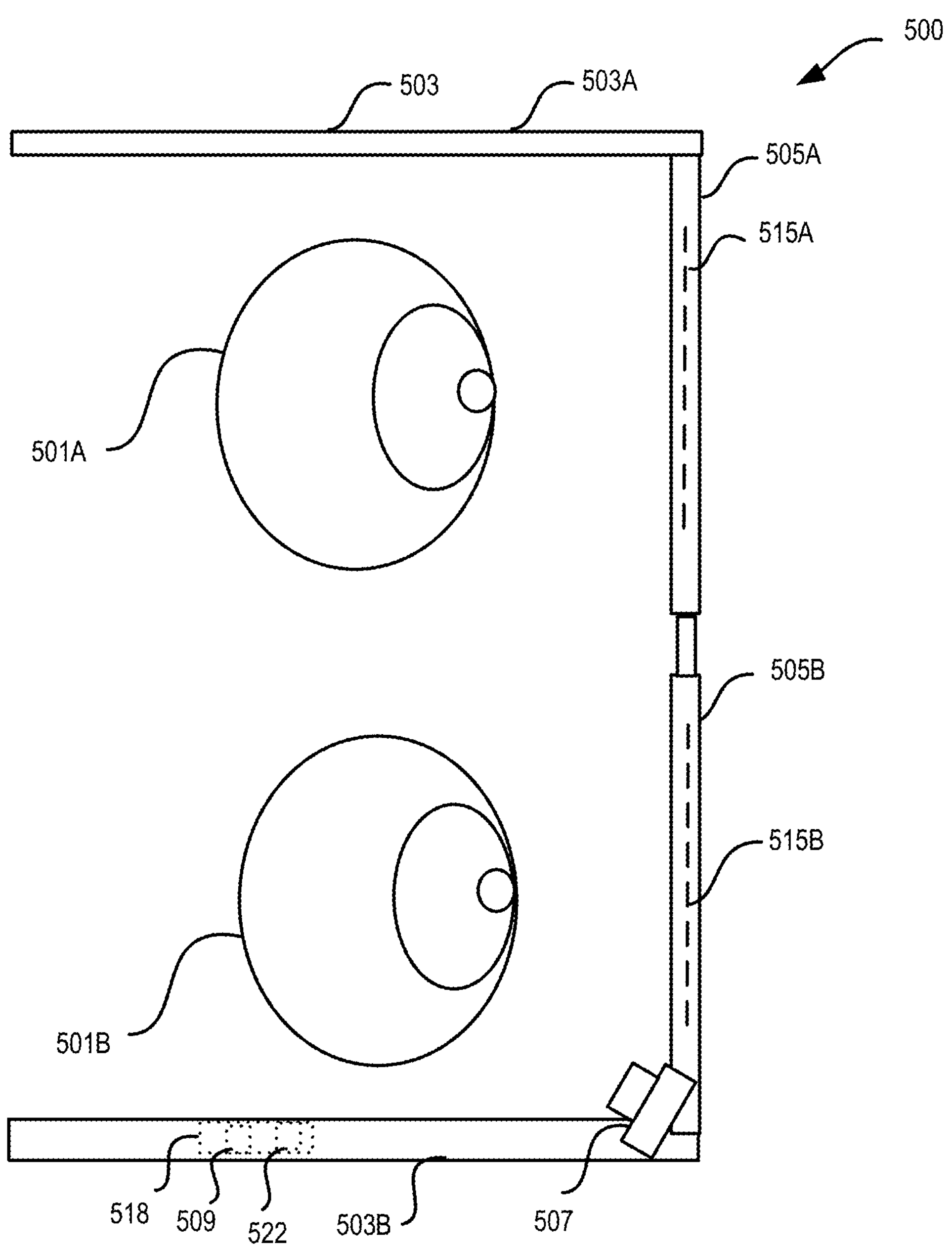
FIG. 5 illustrates a head mounted device coupled with a polarization sensor, in accordance with aspects of the disclosure.

Referring now to FIG. 5 which illustrates a head mounted device coupled with a polarization sensor, in accordance with aspects of the disclosure. As shown, head mounted device 500 includes a polarization sensor 507 coupled to a frame 503. Frame 503 includes lenses 505A and 505B coupled to respective temple arms 503A and 503B. In aspects, polarization sensor 507 comprises a polarization sensitive camera or scanner that scans either point, line, or a custom 3D engineered light pattern. In FIG. 5, head mounted device 500 may be AR/VR glasses (or in other embodiments, other head mounted display) and polarization sensor 507 is located in a corner of frame 503 adjacent to a temple arm 503B and a lens 505B. Note that in various embodiments, polarization sensor 507 may be integrated or located at other locations proximate to frame 503 as long as it can detect at least a portion of eye 501A and/or 501B. In some examples, polarization sensor 507 may be positioned to perform retinal imaging to allow features such as vessel maps to be utilized for user authentication. In some embodiments, depth resolution is used in conjunction with retinal imaging as different layers of the retina may affect polarization of the light differently.

In various embodiments, polarization sensor 507 may be a scanner that includes a dynamic polarizer that can capture different polarization states sequentially. In embodiments, the scanner may detect only a single linearly polarized light state while two or more light sources with orthogonal polarization states (or other increments such as 60°, 45° or other, if more states are used) may be switched on in rapid sequence for quick successive captures of images for capturing polarization characteristics including birefringence maps. In various aspects, the scanner may be positioned either on a frame 503 or in another location, coupled with a beamsplitter near the scanner to optimize for collection of backscattered light.

Furthermore, in aspects, a polarization sensor may perform an additional process of analyzing movement dynamics of an eye to be included in the authentication process. For example, information compared during authentication may include confirmation that movements follow expected oculomotor control patterns (such as during saccades and micro saccades).

Note that lenses 505A and 505B may appear transparent to a user to facilitate augmented reality or mixed reality to enable a user to view scene light from the environment around her while also receiving image light directed to her eye(s) by, for example, waveguides (not shown). In some aspects, waveguides may direct image light generated by a display layer, e.g., 515A/515B or other display (not shown) that may be included in or on lenses 505A and 505B to an eyebox area for viewing by a user of head mounted device 500. In some examples, displays may include a liquid crystal display (LCD), an organic light emitting diode (OLED) display, micro-LED display, quantum dot display, pico-projector, or liquid crystal on silicon (LCOS) display for directing image light to a wearer of head mounted device 500. In various embodiments, display layers 515A and 515B (also "AR/VR display(s)") included in lenses 505A and 505B may serve as or include a light source to illuminate eyes 501A/501B with polarized light. In some aspects, a time sequence that captures iris constriction in response to increased light levels provided by the AR/VR display or other light source may be used to further increase a robustness of liveness detection.

Note that a processing logic 509 may be coupled to a memory 522 included in a controller 518 and may perform operations as described below in FIG. 7. The location of processing logic 509 on a temple arm 503B is merely an example and may be located at any suitable location from which to operate a light source or polarization sensor 507.

Figure 6:
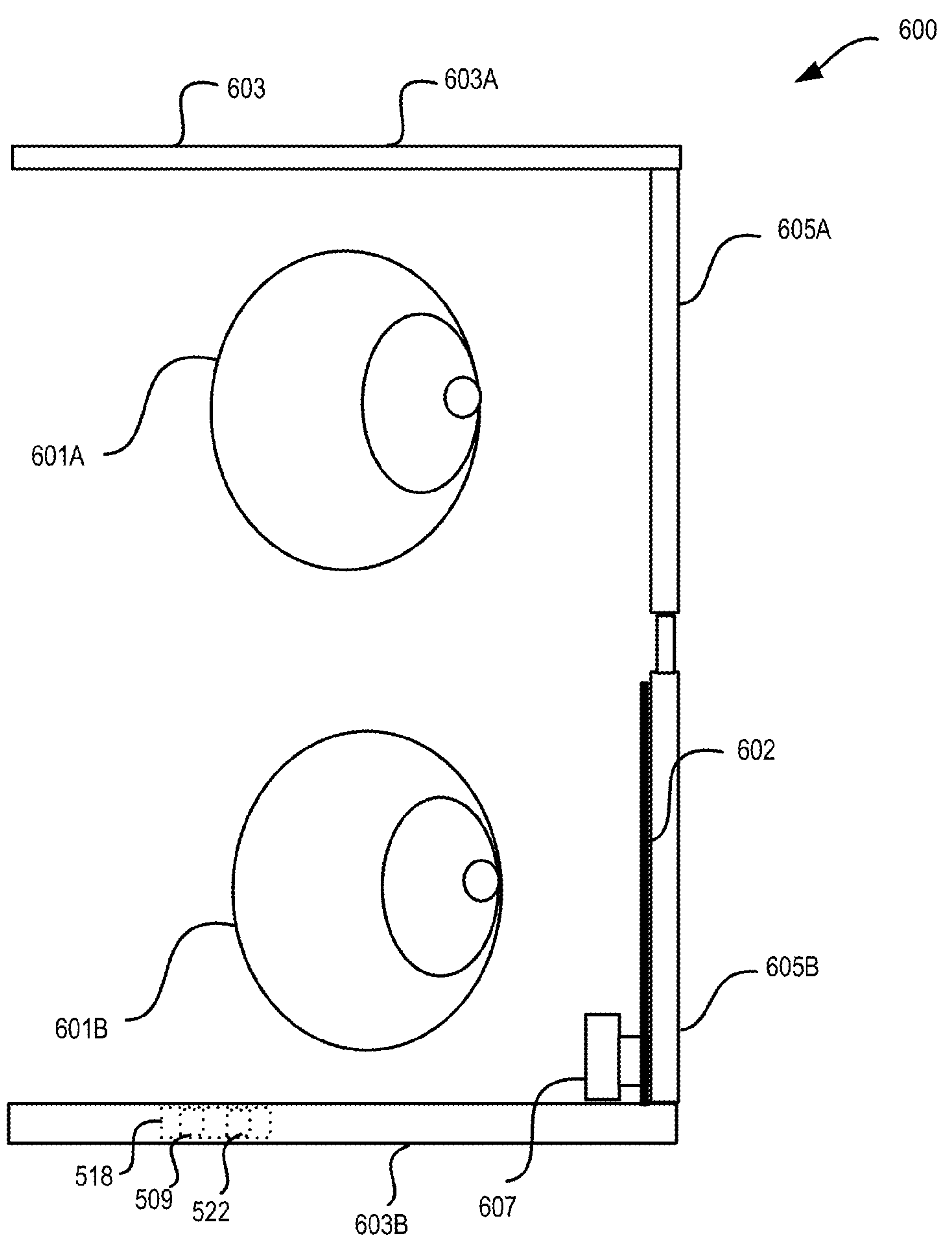
FIG. 6 illustrates a head mounted device including a polarization sensor coupled with a waveguide, in accordance with aspects of the disclosure.

Referring now to FIG. 6 which illustrates a head mounted device including a polarization sensor coupled with a waveguide, in accordance with aspects of the disclosure. FIG. 6 shows a head mounted device 600 including a frame 603 including temple arms 603A and 603B coupled to lenses 605A and 605B. In FIG. 6, a polarization sensor 607 (e.g., similar to as shown in FIGS. 1 & 3) is coupled to a waveguide 602. Lenses 605A and 605B are in front of respective eyes 601A and 601B and may include a display or display layer (not shown in order to avoid obscuring the FIG) similar to as described in connection with FIG. 5. In aspects, waveguide 602 allows a polarization sensitive camera or polarization sensor 607 to capture an image from a more advantageous position directly in front of a user's eye. Frame 603 may also include or be coupled to a controller 518, processing logic 509, and memory 522, similar to as shown and described in connection with FIG. 5.

Figure 7:
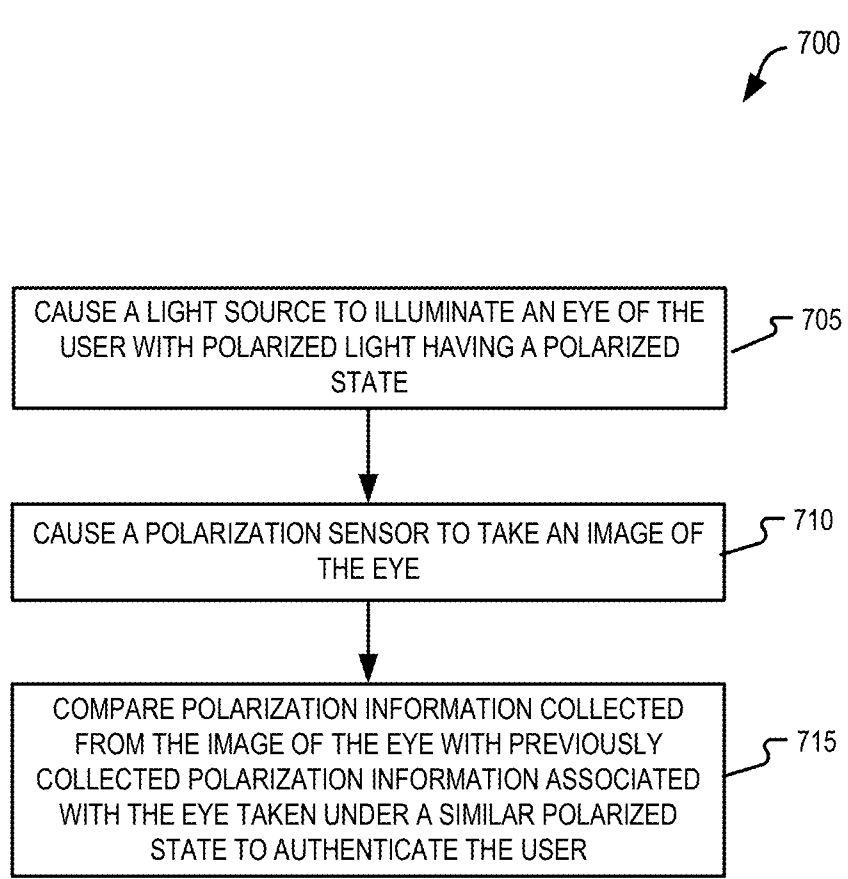
FIG. 7 is a flow diagram of an example process, in accordance with aspects of the disclosure.

To further illustrate, FIG. 7 is a flow diagram of an example process 700, in accordance with aspects of the disclosure. In embodiments, process 700 may be performed by a head mounted device, e.g., 500 or 600 of FIGS. 5 and 6, or elements of head mounted device 500 or 600 or processing logic as discussed further below. At a first process block 705, in some aspects, a light source is caused to illuminate an eye of a user with polarized light having a polarized state. At a next process block 710, a polarization sensor (e.g., 102, 300, 507, or 607 of FIGS. 1, 3, 5, and 6) takes an image of the eye. Finally, at a process block 715, polarization information collected from the image of the eye (e.g., polarization characteristics described in connection with FIG. 2) is compared with previously collected polarization information associated with the eye taken under a similar polarized state to authenticate the user.

Note that the order in which some or all of the process blocks appear in process 700 should not be deemed limiting. Rather, one of ordinary skill in the art having the benefit of the present disclosure will understand that some of the process blocks may be executed in a variety of orders not illustrated, or even in parallel.

Note also that light sources (e.g., light source 101 of FIG. 1 or as shown and described in connection with FIGS. 5 and 6) discussed herein may include any suitable illumination source to illuminate an eye with polarized light. Light sources may be, for example, light emitting diodes (LEDs), vertical-cavity surface-emitting lasers (VCSELs), micro light emitting diode (micro-LED), an edge emitting LED, a superluminescent diode (SLED), or another type of light source. Light sources may emit non-visible light, according to an embodiment. Light sources may emit near infrared light, according to an embodiment. In some embodiments, light sources and/or cameras used for eye tracking purposes may be modified to perform similar functions as described in conjunction with the embodiments described herein.

Note that the polarization sensors discussed herein may include complementary metal-oxide semiconductor (CMOS) image sensors. Note also that although only one polarization sensor or polarization sensitive camera has been illustrated on the head mounted devices in the FIGS, the number as well as location or position of polarization sensors or polarization sensitive cameras may vary according to features offered by the relevant AR/VR or other system.

As shown previously, head mounted devices 500 and 600 of FIGS. 5 and 6 may include supporting hardware incorporated into a frame and/or its temple arms. The hardware of a head mounted device may include, e.g., controller 518, that may assist in performance of operations of FIG. 7. Controller 518 and/or a processing logic (e.g., 509) may include circuitry, logic, ASIC circuitry, FPGA circuitry, and/or one or more processors. Controller 518 may include any of processing logic 509, wired, and/or wireless data interface for sending and receiving data, graphic processors, and one or more memories 522 for storing data and computer executable instructions. One or more memories 522 may store instructions that when executed by processing logic 509, cause head mounted device 500 (or 600) to perform operations as described in process 700 of FIG. 7.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head mounted device connected to a host computer system, a standalone head mounted device, a mobile device or computing system, or any other hardware platform capable of providing artificial reality content to one or more viewers.

A "memory" or "memories" (e.g., 522) described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

A Network that an example head mounted device may be connected to may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels may include or be routed through one or more wired or wireless communication utilizing IEEE 802.11 protocols, short-range wireless protocols, SPI (Serial Peripheral Interface), I2C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A system for authentication of a user, comprising:

a light source to transmit polarized light;

a polarization sensor; and processing logic coupled to the light source and the polarization sensor, wherein the processing logic is to perform operations including to:

cause the light source to illuminate an eye of the user with the polarized light;

cause the polarization sensor to take an image of the eye of the user to collect an angle of linear polarization and a degree of linear polarization particular to the eye when illuminated with the polarized light, the angle of linear polarization and degree of linear polarization based on a tissue of the eye of the user that is uniquely birefringent; and compare the angle of linear polarization and the degree of linear polarization with a previously collected angle of linear polarization and degree of linear polarization associated with the eye, the angle of linear polarization and degree of linear polarization based on the tissue of the eye of the user that is uniquely birefringent to authenticate the user and confirm a liveness of the eye.

2. The system of claim 1 wherein the polarization sensor is configured to further collect a combination of intensity information corresponding to a pattern of the polarized light received from an iris together with the angle of linear polarization and degree of linear polarization to authenticate the liveness of the eye of the user.

3. The system of claim 1 wherein the previously collected angle of linear polarization and degree of linear polarization are gathered during a calibration process.

4. The system of claim 3 wherein the image of the eye is taken when illuminated with light of a same polarization state as polarized light used to illuminate the eye during the calibration process.

5. The system of claim 1 wherein the system comprises a head mounted device and the light source includes an artificial reality/virtual reality (AR/VR) display.

6. The system of claim 1 further comprising a display and wherein gaze targets are included in virtual images presented by the display to assist with liveness detection.

7. The system of claim 1, wherein the polarization sensor is included in a polarization sensitive camera coupled to an (AR/VR) artificial reality/virtual reality display.

8. The system of claim 1, wherein the polarization sensor includes a combination of intensity-only sensitive pixels and polarization sensitive pixels.

9. The system of claim 8, wherein a density of the intensity-only sensitive pixels is higher than a density of the polarization sensitive pixels in the polarization sensor.

10. A method for authentication of a user, comprising:

causing a light source to illuminate an eye of the user with polarized light having a polarized state;

causing a polarization sensor to take an image of the eye to collect an angle of linear polarization and a degree of linear polarization particular to the eye when illuminated with the polarized light, the angle of linear polarization and degree of linear polarization based on a tissue of the eye of the user that is uniquely birefringent; and comparing the angle of linear polarization and the degree of linear polarization collected from the image of the eye with a previously collected angle of linear polarization and degree of linear polarization associated with the eye, the angle of linear polarization and degree of linear polarization based on the tissue of the eye of the user that is uniquely birefringent taken while the eye was illuminated under a similar polarization state, to authenticate the user and confirm a liveness of the eye.

11. The system of claim 1, wherein the tissue of the eye of the user that is uniquely birefringent enables the polarization sensor to obtain additional contrast that is used to identify the user and confirm the liveness of the eye.

12. The method of claim 10 wherein the polarization sensor is configured to further collect a combination of intensity information corresponding to a pattern of the polarized light received from an iris together with the angle of linear polarization and the degree of linear polarization to assist in detecting the liveness of the eye.

13. The method of claim 10 wherein the polarization sensor includes polarization sensitive pixels that are sensitive to different polarization states.

14. The method of claim 10 wherein the previously collected angle of linear polarization and degree of linear polarization associated with the eye of the user is gathered during a calibration process.

15. The method of claim 14 wherein the calibration process includes causing the light source to illuminate the eye and the polarization sensor to collect the angle of linear polarization and the degree of linear polarization associated with the eye of the user under the similar polarization state.

16. The method of claim 10, wherein the tissue of the eye of the user that is uniquely birefringent enables the polarization sensor to obtain additional contrast that is used to identify the user and confirm the liveness of the eye.

17. A system for authentication of a user, comprising:

a light source to illuminate an eye of the user with polarized light; and a polarization sensor to detect light received back from the eye of the user, and wherein an angle of linear polarization and a degree of linear polarization of the light detected received back from the eye, the angle of linear polarization and degree of linear polarization based on a tissue of the eye of the user that is uniquely birefringent, is used for identifying the user by comparing a previously collected angle of linear polarization and degree of linear polarization, the angle of linear polarization and degree of linear polarization based on the tissue of the eye of the user that is uniquely birefringent to confirm that the eye is live.

18. The system of claim 17 wherein the polarization sensor comprises a polarization sensitive camera to take a single image of the eye or a plurality of time-sequenced images.

19. The system of claim 17 wherein the polarization sensor includes a point scanner having a dynamic polarizer to capture different polarization states.

20. The system of claim 19 wherein the light source and the polarization sensor are coupled with a waveguide proximate to a lens in an AR/VR display.

* * * * *